United States Patent [19]

Shakib et al.

[11] Patent Number: 5,813,013
[45] Date of Patent: Sep. 22, 1998

[54] REPRESENTING RECURRING EVENTS

[75] Inventors: Darren Arthur Shakib, Redmond; Sridhar Sundararaman, Issaquah; David Joseph Robert Cornfield; Salim Alam, both of Redmond; David Charles Whitney, Bellevue, all of Wash.

[73] Assignee: Microsoft Corporation, Redmond, Wash.

[21] Appl. No.: 656,986

[22] Filed: Jun. 6, 1996

[51] Int. Cl.[6] ..................................................... A06F 17/30
[52] U.S. Cl. ............................................. 707/102; 707/104
[58] Field of Search ................................ 395/6; 707/102, 707/104

[56] References Cited

U.S. PATENT DOCUMENTS

| | | | |
|---|---|---|---|
| 4,862,357 | 8/1989 | Ahlstrom et al. | 395/206 |
| 4,866,611 | 9/1989 | Cree et al. | 364/705.08 |
| 5,006,985 | 4/1991 | Ehret et al. | 395/201 |
| 5,191,523 | 3/1993 | Whitesage | 395/206 |
| 5,218,699 | 6/1993 | Brandle et al. | 395/650 |
| 5,247,676 | 9/1993 | Ozur et al. | 395/650 |
| 5,283,856 | 2/1994 | Gross et al. | 395/51 |
| 5,570,283 | 10/1996 | Shoolery et al. | 395/205 |
| 5,649,117 | 7/1997 | Landry | 705/40 |

OTHER PUBLICATIONS

Shirley, John and Rosenbury, Ward, "Microsoft RPC Programming Guide", O'Reilly & Associates, 1995.

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

Microsoft Schedule+ for Windows Calendaring and Scheduling Program, *User's Guide*, Published by Microsoft Press, 1992.

Microsoft Schedule+ for Windows Calendaring and Scheduling Program, *Administrator's Guide*, Published by Microsoft Press, 1992.

Getting Started with Microsoft Schedule+ for Windows 95, Published by Microsoft Press, 1995.

*Primary Examiner*—Wayne Amsbury
*Attorney, Agent, or Firm*—Workman, Nydegger & Seeley

[57] ABSTRACT

A series of recurring events is represented using a computer system that includes a processor and a storage medium readable by the processor. The series is represented by storing on the storage medium a pattern that represents dates on which events in the series of recurring events occur. The pattern includes a first entry that may identify days of a week on which an event in the series of recurring events may occur, a second entry that may provide a measure of a number of days between events in the series of recurring events, and a third entry that may provide a measure of a number of months between events in the series of recurring events. Indicators that indicate whether each of the first, second or third entries are to be considered in extracting occurrences of the series of recurring events from the pattern are also stored on the storage medium. The indicators may be stored within the entries.

27 Claims, 13 Drawing Sheets

| ENTRY | TREE |
|---|---|
| 105 — START DATE | DATE |
| 110 — END DATE | DATE |
| 115 — RECURRENCE TYPE | BIT MASK |
| 120 — DAY INTERVAL | NUMBER |
| 125 — WEEK INTERVAL | NUMBER |
| 130 — MONTH INTERVAL | NUMBER |
| 135 — YEAR INTERVAL | NUMBER |
| 140 — DAY OF WEEK | BIT MASK |
| 145 — DAY OF MONTH | BIT MASK |
| 150 — MONTH OF YEAR | BIT MASK |
| 155 — START OF WEEK | NUMBER FROM 1-7 |
| 160 — START TIME | TIME |
| 165 — END TIME | TIME |
| 170 — TIME ZONE | TIME ZONE |
| 175 — DESCRIPTION | DESCRIPTIVE DATE |

Figures 2A, 2B:
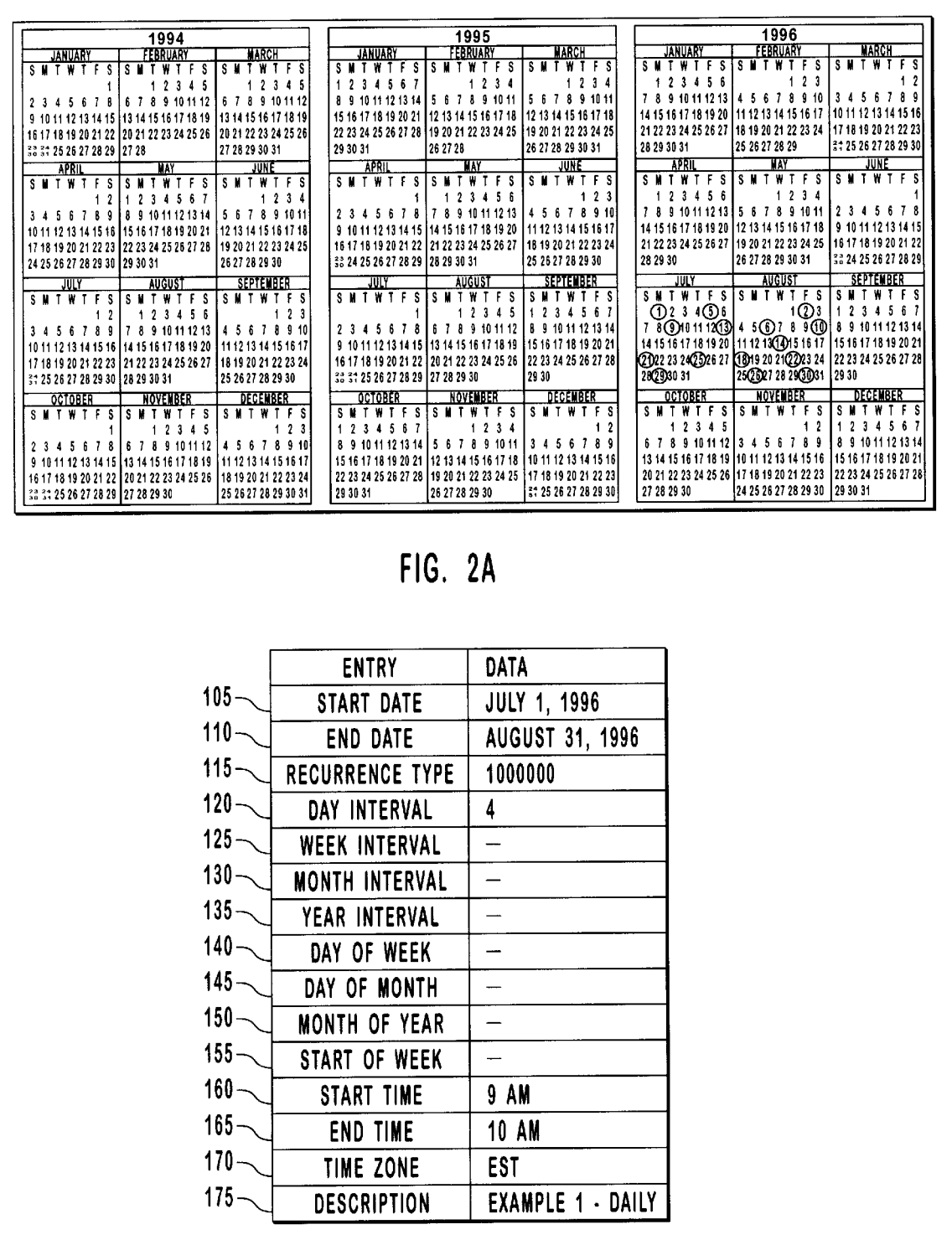

| | ENTRY | DATA |
|---|---|---|
| 105 | START DATE | JULY 1, 1996 |
| 110 | END DATE | AUGUST 31, 1996 |
| 115 | RECURRENCE TYPE | 1000000 |
| 120 | DAY INTERVAL | 4 |
| 125 | WEEK INTERVAL | — |
| 130 | MONTH INTERVAL | — |
| 135 | YEAR INTERVAL | — |
| 140 | DAY OF WEEK | — |
| 145 | DAY OF MONTH | — |
| 150 | MONTH OF YEAR | — |
| 155 | START OF WEEK | — |
| 160 | START TIME | 9 AM |
| 165 | END TIME | 10 AM |
| 170 | TIME ZONE | EST |
| 175 | DESCRIPTION | EXAMPLE 1 - DAILY |

Figures 3A, 3B:
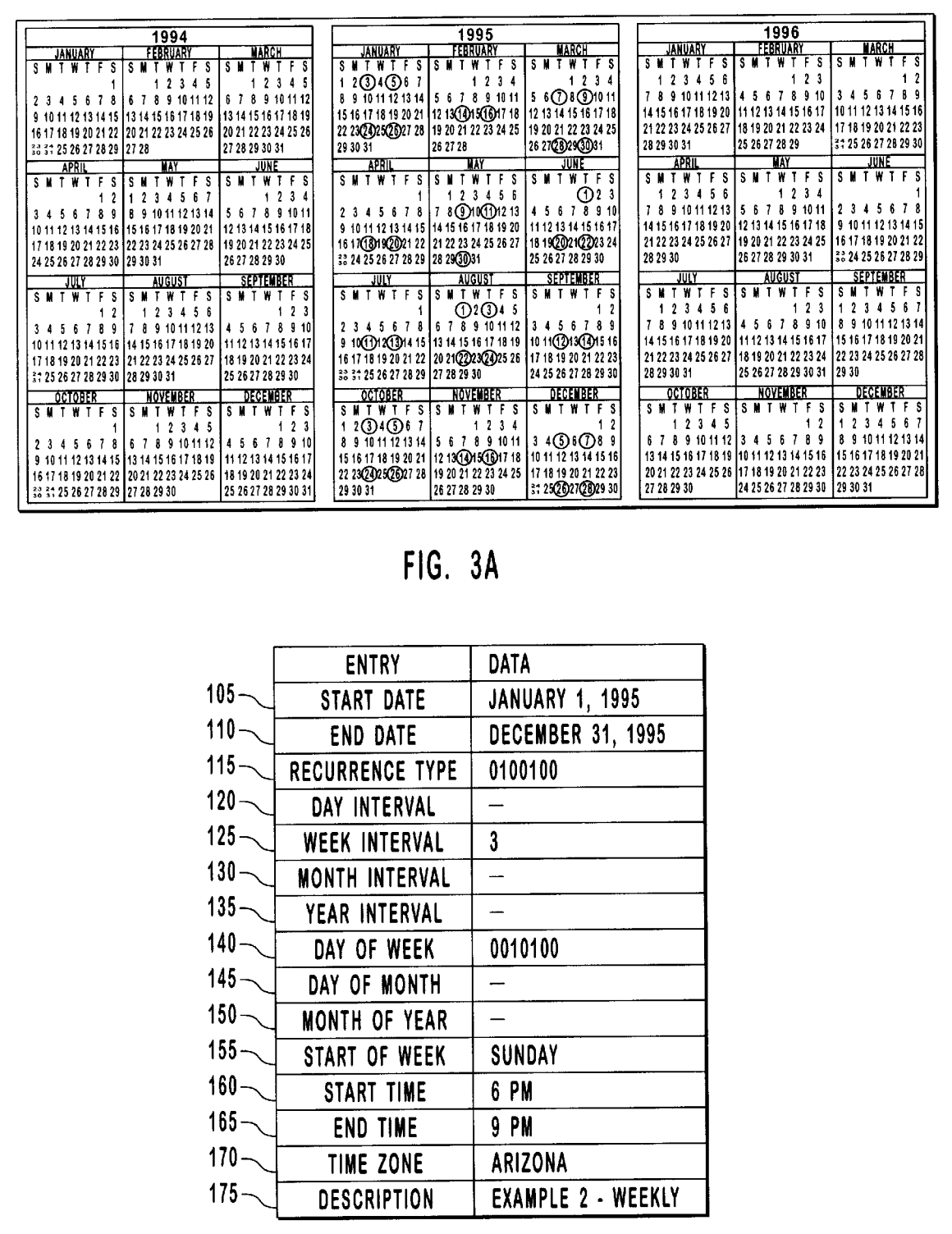

| ENTRY | DATA |
|---|---|
| 105 — START DATE | JANUARY 1, 1995 |
| 110 — END DATE | DECEMBER 31, 1995 |
| 115 — RECURRENCE TYPE | 0100100 |
| 120 — DAY INTERVAL | — |
| 125 — WEEK INTERVAL | 3 |
| 130 — MONTH INTERVAL | — |
| 135 — YEAR INTERVAL | — |
| 140 — DAY OF WEEK | 0010100 |
| 145 — DAY OF MONTH | — |
| 150 — MONTH OF YEAR | — |
| 155 — START OF WEEK | SUNDAY |
| 160 — START TIME | 6 PM |
| 165 — END TIME | 9 PM |
| 170 — TIME ZONE | ARIZONA |
| 175 — DESCRIPTION | EXAMPLE 2 - WEEKLY |

Figures 4A, 4B:
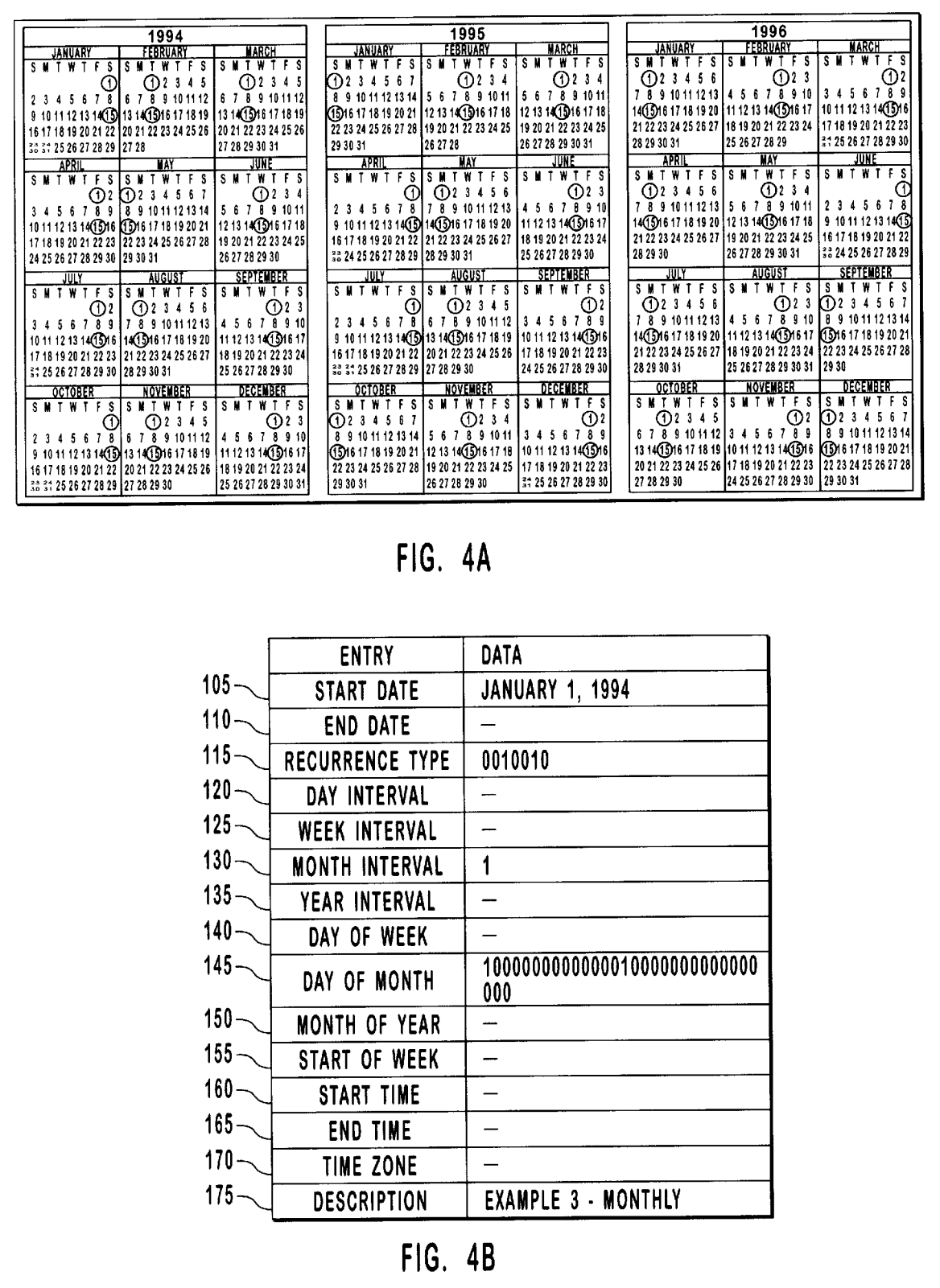

| ENTRY | DATA |
|---|---|
| 105 — START DATE | JANUARY 1, 1994 |
| 110 — END DATE | — |
| 115 — RECURRENCE TYPE | 0010010 |
| 120 — DAY INTERVAL | — |
| 125 — WEEK INTERVAL | — |
| 130 — MONTH INTERVAL | 1 |
| 135 — YEAR INTERVAL | — |
| 140 — DAY OF WEEK | — |
| 145 — DAY OF MONTH | 100000000000001000000000000000 |
| 150 — MONTH OF YEAR | — |
| 155 — START OF WEEK | — |
| 160 — START TIME | — |
| 165 — END TIME | — |
| 170 — TIME ZONE | — |
| 175 — DESCRIPTION | EXAMPLE 3 - MONTHLY |

Figures 5A, 5B:
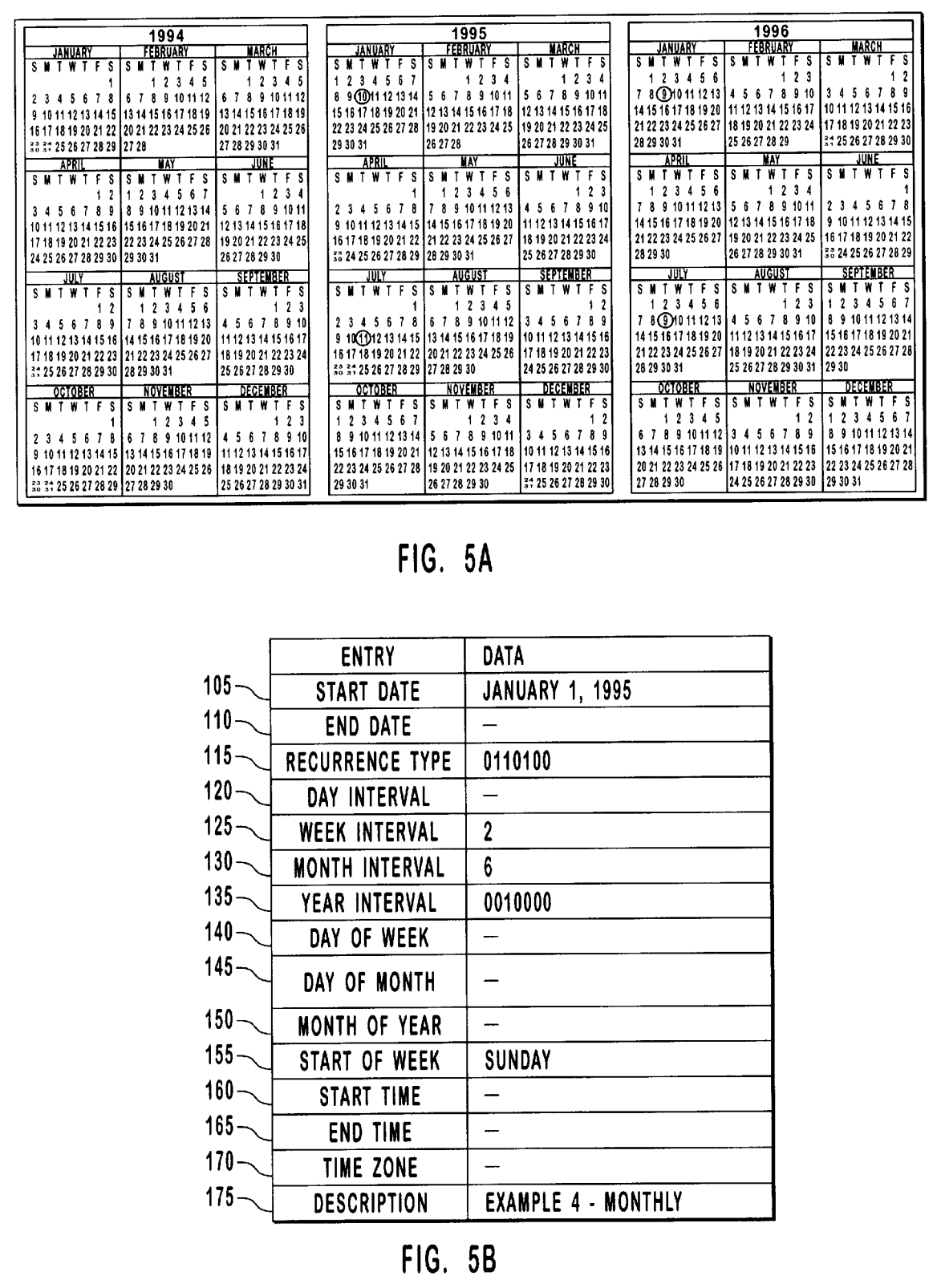

| | ENTRY | DATA |
|---|---|---|
| 105 | START DATE | JANUARY 1, 1995 |
| 110 | END DATE | — |
| 115 | RECURRENCE TYPE | 0110100 |
| 120 | DAY INTERVAL | — |
| 125 | WEEK INTERVAL | 2 |
| 130 | MONTH INTERVAL | 6 |
| 135 | YEAR INTERVAL | 0010000 |
| 140 | DAY OF WEEK | — |
| 145 | DAY OF MONTH | — |
| 150 | MONTH OF YEAR | — |
| 155 | START OF WEEK | SUNDAY |
| 160 | START TIME | — |
| 165 | END TIME | — |
| 170 | TIME ZONE | — |
| 175 | DESCRIPTION | EXAMPLE 4 - MONTHLY |

| ENTRY | DATA |
|---|---|
| 105 — START DATE | JANUARY 1, 1994 |
| 110 — END DATE | — |
| 115 — RECURRENCE TYPE | 0001011 |
| 120 — DAY INTERVAL | — |
| 125 — WEEK INTERVAL | — |
| 130 — MONTH INTERVAL | — |
| 135 — YEAR INTERVAL | 1 |
| 140 — DAY OF WEEK | — |
| 145 — DAY OF MONTH | 000000000000000000000000000001 |
| 150 — MONTH OF YEAR | 000000000001 |
| 155 — START OF WEEK | — |
| 160 — START TIME | — |
| 165 — END TIME | — |
| 170 — TIME ZONE | — |
| 175 — DESCRIPTION | EXAMPLE 5 - YEARLY |

Figures 7A, 7B:
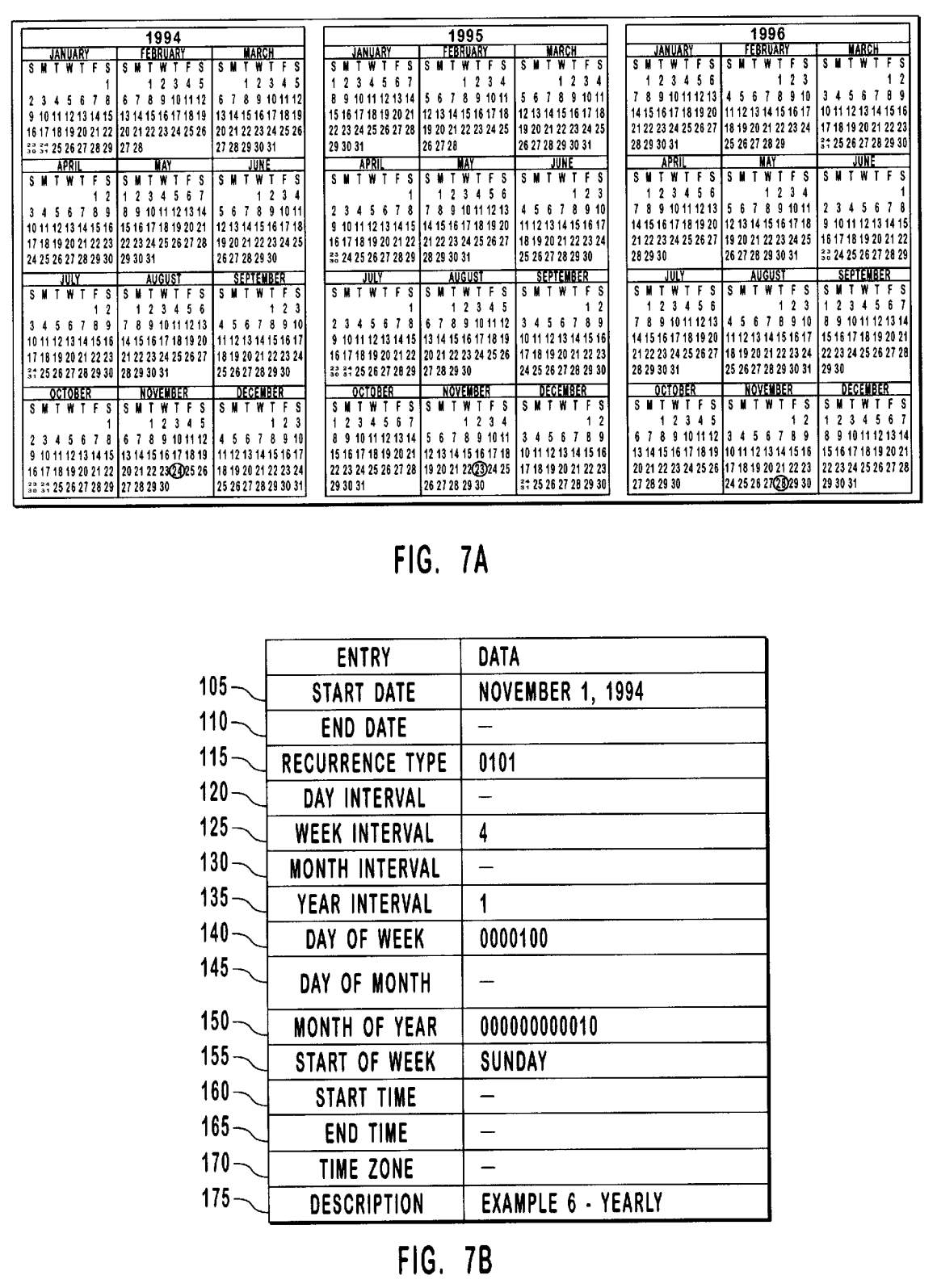

| | ENTRY | DATA |
|---|---|---|
| 105 | START DATE | NOVEMBER 1, 1994 |
| 110 | END DATE | — |
| 115 | RECURRENCE TYPE | 0101 |
| 120 | DAY INTERVAL | — |
| 125 | WEEK INTERVAL | 4 |
| 130 | MONTH INTERVAL | — |
| 135 | YEAR INTERVAL | 1 |
| 140 | DAY OF WEEK | 0000100 |
| 145 | DAY OF MONTH | — |
| 150 | MONTH OF YEAR | 000000000010 |
| 155 | START OF WEEK | SUNDAY |
| 160 | START TIME | — |
| 165 | END TIME | — |
| 170 | TIME ZONE | — |
| 175 | DESCRIPTION | EXAMPLE 6 - YEARLY |

Figures 8A, 8B:
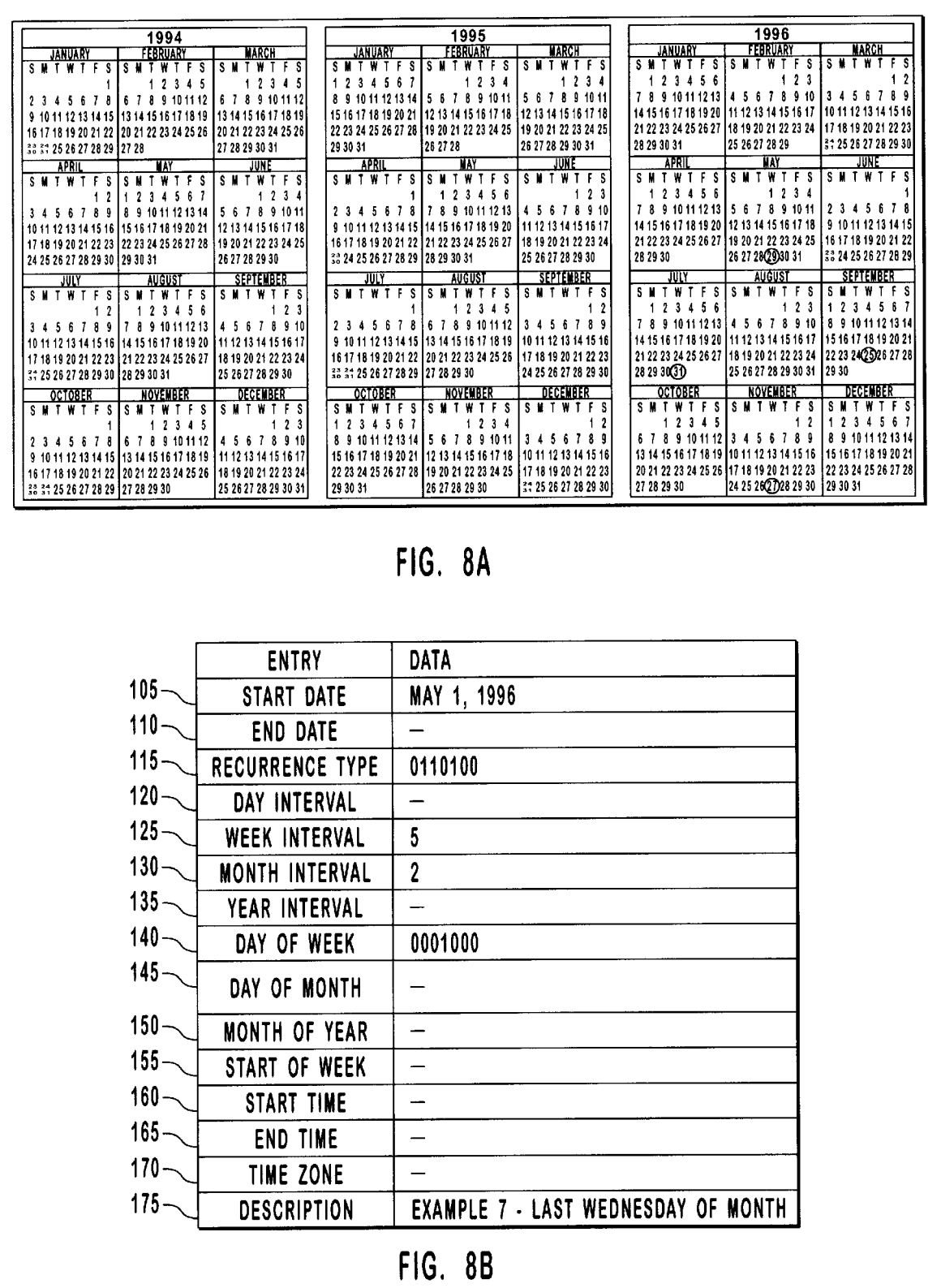

| | ENTRY | DATA |
|---|---|---|
| 105 | START DATE | MAY 1, 1996 |
| 110 | END DATE | — |
| 115 | RECURRENCE TYPE | 0110100 |
| 120 | DAY INTERVAL | — |
| 125 | WEEK INTERVAL | 5 |
| 130 | MONTH INTERVAL | 2 |
| 135 | YEAR INTERVAL | — |
| 140 | DAY OF WEEK | 0001000 |
| 145 | DAY OF MONTH | — |
| 150 | MONTH OF YEAR | — |
| 155 | START OF WEEK | — |
| 160 | START TIME | — |
| 165 | END TIME | — |
| 170 | TIME ZONE | — |
| 175 | DESCRIPTION | EXAMPLE 7 - LAST WEDNESDAY OF MONTH |

| ENTRY | DATA |
|---|---|
| 105 — START DATE | JANUARY 1, 1994 |
| 110 — END DATE | — |
| 115 — RECURRENCE TYPE | |
| 120 — DAY INTERVAL | — |
| 125 — WEEK INTERVAL | — |
| 130 — MONTH INTERVAL | — |
| 135 — YEAR INTERVAL | 1 |
| 140 — DAY OF WEEK | 0010000 |
| 145 — DAY OF MONTH | 0111111100000000000000000000000 |
| 150 — MONTH OF YEAR | 000000000010 |
| 155 — START OF WEEK | — |
| 160 — START TIME | — |
| 165 — END TIME | — |
| 170 — TIME ZONE | — |
| 175 — DESCRIPTION | EXAMPLE 8 - ELECTION DAY |

FIG. 9B

REPRESENTING RECURRING EVENTS

BACKGROUND OF THE INVENTION

The invention is directed to computer-implemented representation of recurring events.

Electronic appointment books and other applications often need to describe recurring events. For example, a person who needed to attend a staff meeting every Monday might record this information in an electronic appointment book.

Recurring events may be described by including a separate record for each occurrence of the event in a data file of the appointment book. Thus, in the example mentioned above, the data file would have a record corresponding to the staff meeting scheduled on the first Monday of a particular month, a record for the meeting on the second Monday, and so on.

Recurring events also may be described using patterns. For example, Schedule+1.0, electronic appointment book software available from Microsoft Corporation, would describe the series of staff meetings mentioned above using a weekly pattern record that indicated that the staff meetings occurred every Monday. When displaying a person's appointments for a particular range of dates, the software would then generate the particular instances occurring in that range of dates by expanding the weekly pattern. Schedule+1.0 included different types of records to represent other patterns. For example, Schedule+1.0 described a series of meetings that occurred on the fifteenth of every month using a monthly pattern record that indicated that the meetings occurred on the fifteenth.

SUMMARY OF THE INVENTION

A computer-implemented technique for describing recurring events employs a universal pattern format having the flexibility to describe a wide variety of recurring events. The technique's use of a pattern permits a series of recurring events to be described with a single record. This dramatically reduces the amount of storage necessary to describe the series of recurring events relative to techniques that create a record for each occurrence of the event. Such a reduction is particularly important for applications that use a single data file to store information about appointments for a large group of people such as the staff of an entire office or firm. The use of a pattern also permits open-ended series of recurring events to be described.

The technique's use of a universal pattern format provides considerable flexibility relative to the specialized patterns employed by, for example, Schedule+1.0. This flexibility expands the number of pattern types that may be readily supported by an electronic appointment book or other application and ensures that data files created for one application will be compatible with another application that supports a larger number of pattern types.

The universal pattern format may be used to describe events that recur on a daily, weekly, monthly or yearly basis. The format also may be used to represent events that recur with respect to a combination of those bases.

The universal pattern format also includes a time zone representation. When a user is located in a time zone that differs from a time zone associated with the recurring events, the time zone representation permits automatic conversion of the time of the occurrence of the recurring event to a time that is appropriate for the user. This permits a user located in one time zone to schedule a meeting with a user located in another time zone without needing to consider the time difference between the two time zones.

The time zone representation accounts for the effects of different uses of daylight savings time in different regions and at different times of the year. Because of daylight savings time, the offset of a particular time zone from Greenwich mean time (GMT) or some other constant time value may change at different times of the year. The time zone representation automatically accounts for these changes.

In one aspect, the technique features representing a series of recurring events using a computer system that includes a processor and a storage medium readable by the processor. The technique includes storing on the storage medium a pattern that represents dates on which events in the series of recurring events occur. The pattern includes first, second and third entries that may, respectively, identify days of a week on which an event may occur, provide a measure of a number of days between events, and provide a measure of a number of months between events. The technique also includes storing on the storage medium indicators (often in the form of bit masks) that indicate whether each of the first, second or third entries are to be considered in extracting occurrences of the series of recurring events from the pattern. The indicators may be stored within the entries.

Implementations of the technique may include one or more of the following features.

The technique may also include storing on the storage medium a time and a time zone associated with the events in the series of recurring events. Occurrences of the series may be extracted from the pattern. These occurrences may be extracted in a time zone that differs from the time zone associated with the events. The time zones are different in the sense that they each have a different offset from an absolute time value such as GMT. When the time zones are different, a time associated with an occurrence is produced by modifying the time associated with the events based on a difference between the first and second offsets. The technique may also include storing a table that represents offsets from the absolute time value for all time zones.

The pattern may include a number of additional entries, including starting and ending dates and measures of a number of weeks or years between events. Other entries may indicate days of a month or months of a year on which events may occur. Still other entries may identify a week of a month in which events may occur and a day on which weeks begin. A particular value in the entry that indicates a week of a month may indicate that events may occur on the last occurrence in a month of any days identified by the first entry. In most instances, the pattern includes combinations of multiple ones of the measures and indicators, and records for different series of events all include the same pattern. Information identifying exceptions to the pattern may also be stored.

In another aspect, the technique features representing an event using a computer system that includes a processor and a storage medium readable by the processor. The technique includes storing on the storage medium information that identifies the event, and a time and time zone associated with the event.

Implementations of the technique may include extracting a representation of the event from the information stored on the storage medium in a time zone having a first offset from an absolute time value that differs from a second offset from the absolute time value that is a property of the time zone with which the event is associated. The extraction may include modifying the time associated with the event based on a difference between the first and second offsets to produce a time associated with the representation of the event. The technique may also include storing a table that represents offsets from the absolute time value for all time zones.

The information that identifies the event may be a pattern that identifies a series of recurring events and the time and time zone may be associated with the series of recurring events.

The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

BRIEF DESCRIPTION OF THE DRAWINGS

FIGS. 2A–9B illustrate series of recurring events and pattern records corresponding to those series.

DESCRIPTION OF THE PREFERRED EMBODIMENTS

Figure 1:
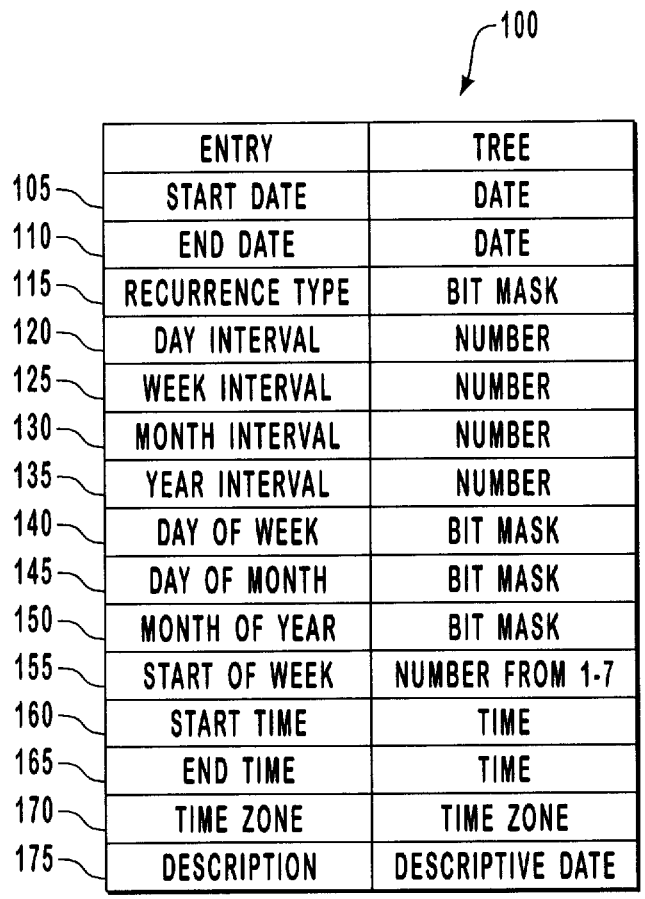
FIG. 1 is a block diagram of a pattern format for representing a series of recurring events.

FIG. 1 illustrates the universal pattern format 100 employed by an implementation of the technique. The pattern includes a starting date 105 that indicates the first date that may include an occurrence of the pattern. The starting date of a pattern does not necessarily include an occurrence of the pattern. For example, when the starting date for a series of Tuesday meetings is Jan. 1, 1997 (a Wednesday), the first occurrence for the pattern would actually be on Jan. 7, 1997. Some implementations may permit the starting date of a pattern to be unspecified.

The next entry in the pattern 100 is an ending date 110 that indicates the last date that may include an occurrence of the pattern. As with the starting date 105, the ending date of a pattern does not necessarily include an occurrence of the pattern. When the ending date of a pattern is unspecified, the pattern is treated as representing a series of recurring events that continue forever.

The next entry is a recurrence type 115 which indicates the type of pattern. The recurrence type is an array of bits, each of which identifies whether a particular entry of the pattern should be used in generating occurrences of the pattern. The recurrence type includes a bit corresponding to each of the day interval 120, the week interval 125, the month interval 130, the year interval 135, the day of week mask 140, the day of month mask 145, and the month of year mask 150 of the format 100. For example, the recurrence type for a pattern representing an appointment that occurs every other Tuesday would have the bits representing the week interval 125 and the day of week mask 140 set to one and the remaining bits set to zero.

The day interval 120, the week interval 125, the month interval 130, and the year interval 135 indicate, respectively, the number of days, weeks, months or years between occurrences. For example, a report that is due every two weeks could be represented by a pattern in which the day interval 120 has a value of 14 or the week interval 125 has a value of two. The value corresponding to each of these entries is an unbounded number.

The week interval 125 has an alternate function when the month interval 130 or the month of year mask 150 is used. In that event, the week interval 125 indicates the week of the month on which events may occur.

The day of week mask 140 indicates the days of the week on which an event may occur. The mask 140 includes seven bits, each of which corresponds to a day of the week. Similarly, the day of month mask 145 and the month of year mask 150 indicate, respectively, the days of the month or the months of a year on which an event of the pattern may occur. The day of month mask 145 includes 31 entries and the month of year mask 150 includes 12 entries.

A start of week entry 155 indicates the day on which a week starts for a particular pattern. This information is useful in calculating a number of weeks because different countries may use different days to represent the start of a week. For example, if a pattern represents a series of events that occur on Tuesday of the second week of each month, and the first day of the month is a Sunday, then an event would occur on the third of the month if weeks start on Mondays and on the tenth of the month if weeks start on Sundays.

A start time 160 and an end time 165 indicate, respectively, the starting and ending times for each occurrence of a recurring event. Leaving these entries unspecified indicates that the event does not occur at a particular time.

A time zone entry 170 identifies the time zone in which the record for the recurring event was created (or the time zone with which it is desired to associate the recurring event). The time zone entry 170 ensures that the starting and ending times for occurrences of the event will be displayed at appropriate times regardless of the time zone in which the occurrences are displayed. This is particularly important when events involve several users located in multiple time zones or when a specific user travels from one time zone to another. Thus, for example, the starting and ending times for a conference call between users in two different time zones would be displayed at the correct time for each of the users. The time zone entry 170 may include either a pointer to an entry in a table of time zone descriptions or information sufficient to describe the time zone, including the effect of daylight savings time on the time zone.

The time zone entry 170 ensures that every user who views occurrences of the recurring event represented by the pattern 100 sees the occurrences in the same absolute time. To make this happen, the date and time of a particular occurrence of an event must be represented relative to the viewer's offset from absolute time. For this purpose, the time zone entry 170 describes the pattern's offset from Greenwich Mean Time (GMT) or some other measure of absolute time (e.g., UTC) and includes additional information about effects of daylight savings time changes. Because of daylight savings time, some time zones will have different offsets from absolute time at different times of the year.

Finally, the pattern format 100 includes descriptive data 175 that provides descriptive information about the pattern. Recurring tasks, appointments and events may each have different types of associated data. Examples of descriptive data include appointment locations, invited attendees and descriptive text.

The pattern format provides considerable flexibility as to the types of recurring events that may be represented. Several types of recurring events and their corresponding patterns are discussed below.

FIG. 2A illustrates a daily event that occurs every four days from 9–10 a.m. Eastern Standard Time (E.S.T.) in July and August of 1996. The pattern for this series of recurring events is illustrated in FIG. 2B. Note that the ending date 110 for the pattern is Aug. 31, 1996, while the last occurrence of the pattern is on Aug. 30, 1996. The recurrence type 115 indicates that the day interval 120 is to be considered and that the other entries designated by the recurrence type are not. The day interval 120 has a value of 4. The starting time 160 and ending time 165 are indicated along with the appropriate time zone 170.

A weekly event that occurred every three weeks from 6–9 p.m. in Arizona on Tuesdays and Thursdays in 1995 and its corresponding pattern are illustrated, respectively, in FIGS. 3A and 3B. Note that occurrences do not take place on either the starting date 105 or the ending date 110. The recurrence type 115 indicates that the week interval 125 and the day of week mask 140 are to be considered. The week interval 125 has a value of 3. The day of week mask 140 indicates that Tuesdays and Thursdays are valid days. The start of week 155 indicates that weeks start on Sundays. The starting time 160 and ending time 165 are indicated along with the appropriate time zone 170.

A monthly event that occurs on the first and fifteenth of every month starting in 1994 and its corresponding pattern are illustrated, respectively, in FIGS. 4A and 4B. The ending date 110 is unspecified so that the pattern continues forever. The recurrence type 115 indicates that the month interval 130 and the day of month mask 145 are to be considered. The month interval 130 has a value of 1. The day of month mask 145 indicates that the first and fifteenth days of the month are valid days. Starting and ending times are not provided. Accordingly, there is no need to provide a time zone 170.

A monthly event that occurs every six months on the second Tuesday of the month starting in 1995 and its corresponding pattern are illustrated, respectively, in FIGS. 5A and 5B. The ending date 110 is unspecified so that the pattern continues forever. The recurrence type 115 indicates that the week interval 125, the month interval 130 and the day of week mask 140 are to be considered. The week interval 125 has a value of 2, which indicates that the second occurrence of a valid day of the week is a valid day. The month interval 130 has a value of 6. The day of week mask 140 indicates that Tuesdays are valid days. There is no need to provide a time zone 170 because starting and ending times are not provided.

An event that occurs every year on December 31 (i.e., New Year's eve) and its corresponding pattern are illustrated, respectively, in FIGS. 6A and 6B. The starting date 105 is Jan. 1, 1994 and the ending date 110 is unspecified. The recurrence type 115 indicates that the year interval 135, the day of month mask 145 and the month of year mask 150 are to be considered. The year interval 135 has a value of 1, indicating that the event occurs every year. The day of month mask 145 indicates that the 31st of the month is a valid day, and the month of year indicates that December, the 12th month, is a valid month.

An event that occurs every year on the fourth Thursday in November and its corresponding pattern are illustrated, respectively, in FIGS. 7A and 7B. The starting date 105 is Nov. 1, 1994 and the ending date 110 is unspecified. The recurrence type 115 indicates that the week interval 125, the year interval 135, the day of week mask 140, and the month of year mask 150 are to be considered. The week interval 125 has a value of 4, which indicates that the fourth occurrence of a valid day of the week is a valid day. The year interval 135 has a value of 1. The day of week mask 140 indicates that Thursdays are valid days. The month of the year mask 150 indicates that November, the 11th month, is a valid month.

An event that occurs on the last Wednesday of every other month starting May 1, 1996 and its corresponding pattern are illustrated, respectively, in FIGS. 8A and 8B. The starting date is May 1, 1996 and the ending date is unspecified. The recurrence type 115 indicates that the week interval 125, the month interval 130, and the day of week mask 140 are to be considered. The week interval 125 has a value of 5. This unconditionally indicates that the last instance of each day identified by the day of week mask 140 is a valid day. The month interval 130 has a value of 2. The day of week mask 140 indicates that Wednesdays are valid days.

As a final example, election day, an event that occurs every year on the first Tuesday following a Monday in November, and its corresponding pattern are illustrated, respectively, in FIGS. 9A and 9B. The starting date 105 is Jan. 1, 1994 and the ending date 110 is unspecified. The recurrence type 115 indicates that the year interval 135, the day of week mask 140, the day of month mask 145, and the month of year mask 150 are to be considered. The year interval 135 has a value of 1. The day of week mask 140 indicates that Tuesdays are valid days. The day of the month mask 145 indicates that the second through the ninth of the month are valid days. The month of the year mask 150 indicates that November, the 11th month, is a valid month.

Figure 10:
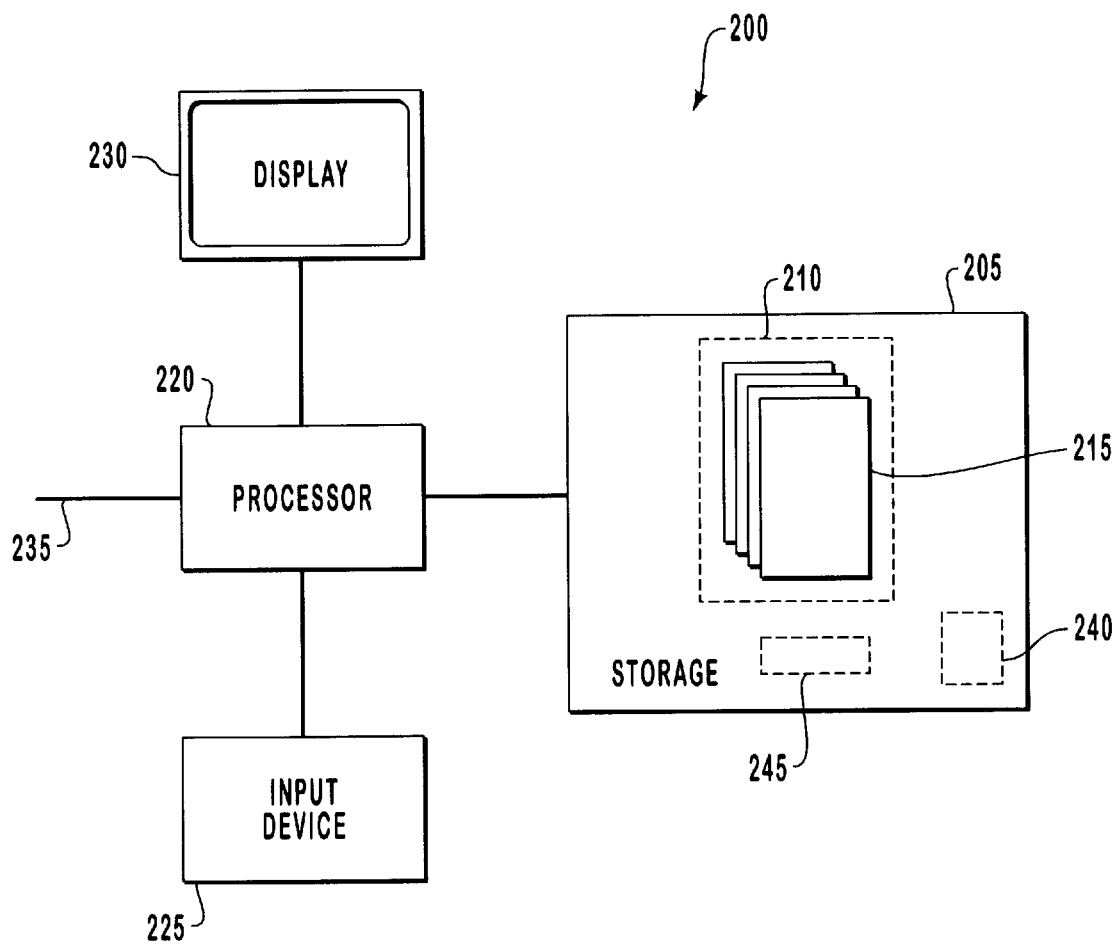
FIG. 10 is a block diagram of a computer system configured to implement the pattern format of FIG. 1.

A computer system 200 that implements the pattern format 100 is illustrated in FIG. 10. The system 200 includes a storage device 205 on which is stored a file 210 that includes records 215. The storage device 205 stores data and is accessible by a processor 220. The storage device may be, for example, a random-access memory, a floppy drive, a hard drive, or a similar processor-accessible storage medium. Each record 215 includes information about a series of recurring events and is formatted according to the pattern format 100.

A processor 220 is connected to the storage device 205. The processor 220 is also connected to an input device 225, such as a keyboard or a mouse, and a display 230.

The processor 220 manipulates the file 210 to add, delete or edit records 215. For example, the processor 220 may add records 215 in response to commands entered by a user using the input device 225 in response to a user interface displayed on the display 230. The processor 220 may also add records received through an external communications link 235. The link 235 could be, for example, a connection to an internal network or server, a modem connection to another processor, or an electronic mail connection to the internet.

The user interface provided for adding, deleting or editing records may take a number of forms. In one approach, the interface permits the user to answer questions or provide information about the properties of a series of recurring events for which the user wishes to create a record. In another approach, calendars similar to those illustrated in FIG. 2A are displayed and the user highlights dates that include occurrences of the recurring events and provides other information such as starting and ending times. In each of these approaches, the processor 220 uses the information provided by the user to create a record 215 having appropriate entries.

In another approach, the interface could provide a user with direct access to the pattern format 100 so that the user could directly enter the desired characteristics of a pattern. This approach would provide maximum flexibility, but might be difficult for users who are unfamiliar with the pattern format 100 to use.

Some entries of the pattern format 100 could be provided by the processor 220 without involvement by the user. For example, information to be placed in the start of week entry 155 and the time zone entry 170 may be stored in a file 240 on the storage device 205, or may be available through communications link 235. When a record 215 is to be added to the file 210, the processor 220 retrieves the start of week and time zone information from the file 240 and places it in the appropriate entries of the record 215.

In addition to adding, deleting or editing records 215, the processor 220 accesses the file 210 to produce occurrences for display to a user. For example, if a user requests a display of all appointments for July 1996, the processor 220 accesses the records 215 in file 210 to determine which records include occurrences in that period and to generate the occurrences. After generating the occurrences, the processor displays them to the user on display 230.

Figure 11:
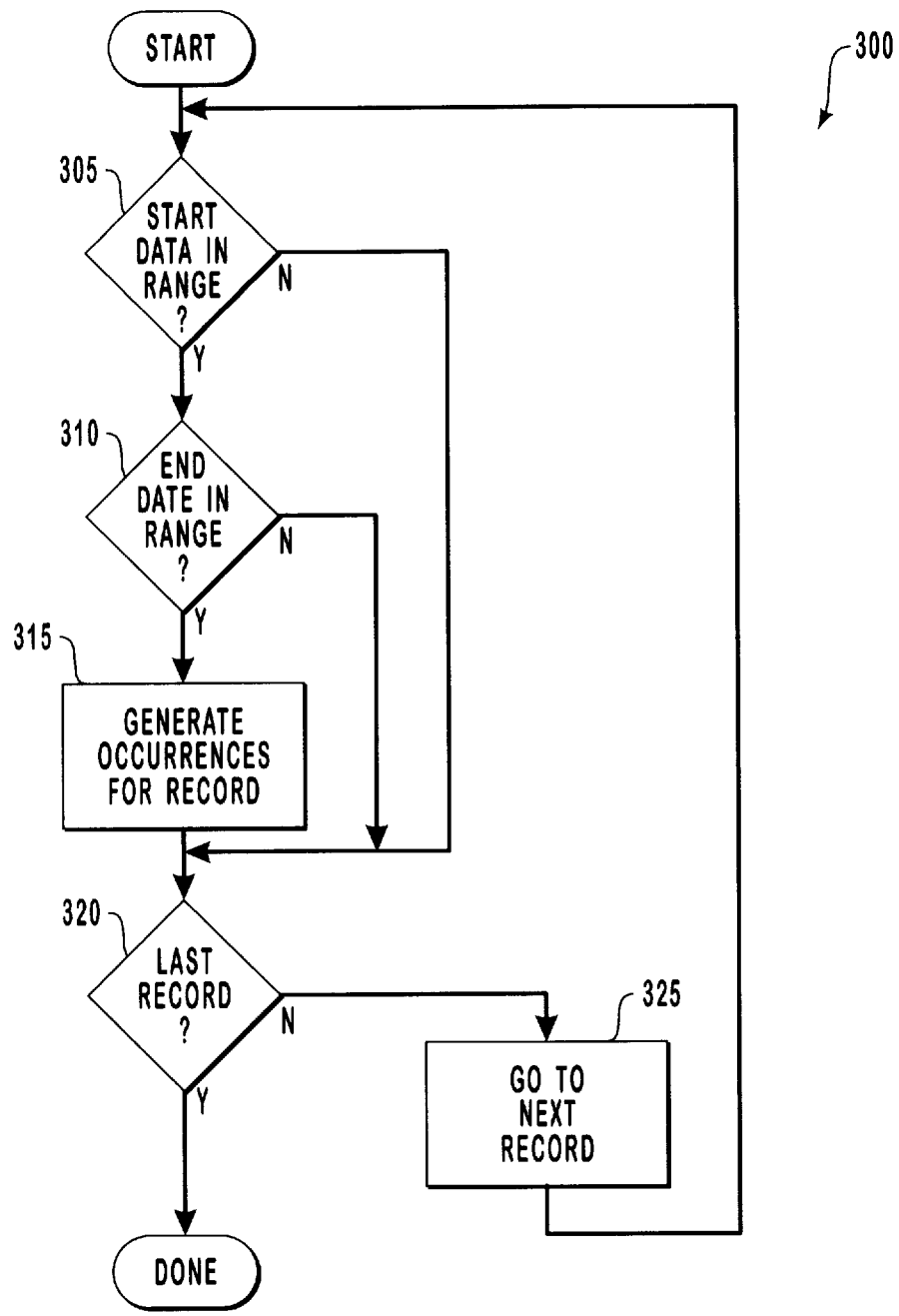
FIGS. 11–13 are flow charts of procedures implemented by a processor of the computer system of FIG. 9.

The processor 220 may generate occurrences for a user-supplied date range according to the procedure 300 illustrated in FIG. 11. Initially, the processor determines whether the start date 105 for a record 215 is valid for the range (step 305). A start date 105 is valid if it is unspecified or if it precedes or matches the last date in the range. If the start date is valid, the processor determines whether the ending date 110 is valid (step 310). As with the start date 105, an ending date 110 is valid if it is unspecified or if it precedes the last date in the range. If the ending date is valid, then the processor 220 generates occurrences for the record and the range of dates (step 315).

After generating the occurrences (step 315), or if the starting or ending dates were invalid (steps 305 and 310), the processor 220 determines whether the record is the last record in the file 210 (step 320). If the record is not the last record, then the processor 220 goes to the next record (step 325) and repeats the procedure. If the record is the last record, then the procedure is done.

Figure 12:
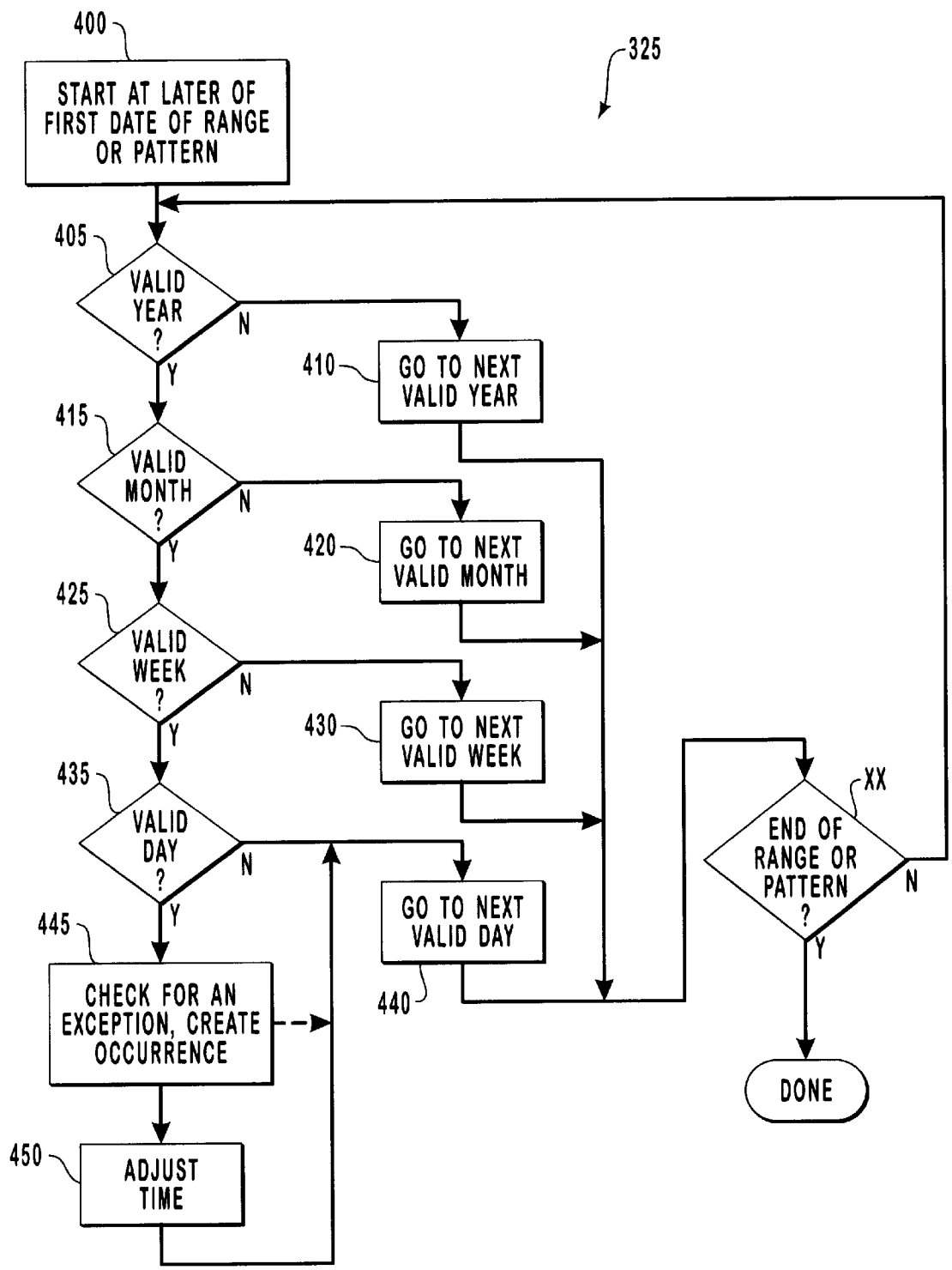

The processor 220 generates occurrences for a record using the procedure 325 illustrated in FIG. 12. The processor 220 begins the procedure by starting at a reference date that is the later of the first date of the range or the starting date 105 of the pattern (step 400).

Next, processor 220 determines whether the year of the reference date is a valid year (step 405). The year is valid if the bit of the recurrence type 115 corresponding to the year interval 135 is set to zero or if the year satisfies the year interval 135 relative to the starting date 105 of the pattern. If the year is not valid, then the processor 220 sets the reference to January 1 of the next valid year (step 410).

If the year is valid, then the processor determines whether the month of the reference date is a valid month (step 415). The month is valid if two conditions are met. The first condition is that the bit of the recurrence type 115 corresponding to the month interval 130 is set to zero or the month satisfies the month interval 130 relative to the starting date 105 of the pattern. The second condition is that the bit of the recurrence type 115 corresponding to the month of year mask 150 is set to zero (i.e., the month of year need not be considered) or the bit of the month of year mask 150 corresponding to the month of the reference date is set to one (i.e., the reference month is a selected month). If the month is not valid, then the processor 220 sets the reference to the first day of the next valid month (step 420).

If the month is valid, then the processor determines whether the week of the reference date is a valid week (step 425). The week is valid if the bit of the recurrence type 115 corresponding to the week interval 125 is set to zero or the week satisfies the week interval 125. If the week is not valid, then the processor 220 sets the reference to the first day of the next valid week, as indicated by the start of week entry 155 (step 430).

If the week is valid, then the processor determines whether the day of the reference date is a valid day (step 435). The day is valid if three conditions are met. The first condition is that the bit of the recurrence type 115 corresponding to the day interval 120 is set to zero or the day satisfies the day interval 120 relative to the starting date 105 of the pattern. The second condition is that the bit of the recurrence type 115 corresponding to the day of week mask 140 is set to zero or the bit of the day of week mask 140 corresponding to the day of the reference date is set to one. The third condition is that the bit of the recurrence type 115 corresponding to the day of month mask 145 is set to zero or the bit of the day of month mask 145 corresponding to the day of the reference date is set to one. If the day is not valid, then the processor 220 sets the reference date to the next valid day (step 440).

If the day is valid, then the processor 220 checks for an exception and, if appropriate, creates an occurrence for the reference date (step 445). Each pattern record may include a table of exceptions associated with the pattern. The table of exceptions permits adjustment of the date, time, or descriptive information for particular occurrences of a pattern. The table of exceptions may also be used to remove particular occurrences from the pattern.

An exception is identified in the table of exceptions by the date on which it would have occurred in the pattern. Accordingly, the processor 220 checks for an exception by looking up the reference date in the table of exceptions.

If the reference date is in the table of exceptions, and the exception indicates that the occurrence is to be removed from the pattern, then processor 220 goes to the next valid day (step 440) and does not create an occurrence for the reference date.

If the reference date is not in the table of exceptions, then the processor 220 creates an occurrence based on the pattern.

The occurrence includes a date that corresponds to the reference date and starting and ending times that correspond, respectively, to the starting time 160 and the ending time 165 of the record 215. The occurrence also includes descriptive information from the pattern.

If the reference date is in the table of exceptions, and the exception does not indicate that the occurrence is to be removed from the pattern, then the processor 220 creates an occurrence based on the information stored in the exception. This information includes the date and time of the adjusted occurrence and descriptive information about the adjusted occurrence. Since all of the information for the occurrence is stored in the exception, changes made to the pattern after the exception has been created will not be reflected in occurrence for the exception. Other implementations may use different approaches. For example, an exception could store only date and time information, and could refer back to the pattern for any other information needed to create an occurrence. Similarly, the exception could store only information that differed from the pattern. Thus, for example, if an exception indicated that a particular occurrence of a meeting was to start fifteen minutes late and otherwise complied with the pattern, then the entry in the table of exceptions would only include the adjusted starting time.

After creating an occurrence, the processor 220 adjusts the time of the occurrence (step 450). Thereafter, the processor 220 goes to the next valid day (step 440).

After going to the next valid year, month, week or day (step 410, 420, 430 or 440), the processor 220 determines whether the reference date is later than the ending date 110 or the last day of the range (step 455). If the reference date is not later than these dates, then the processor 220 repeats the procedure by checking for a valid year (step 405). If the record is later than the indicated dates, then the procedure is done.

Figure 13:
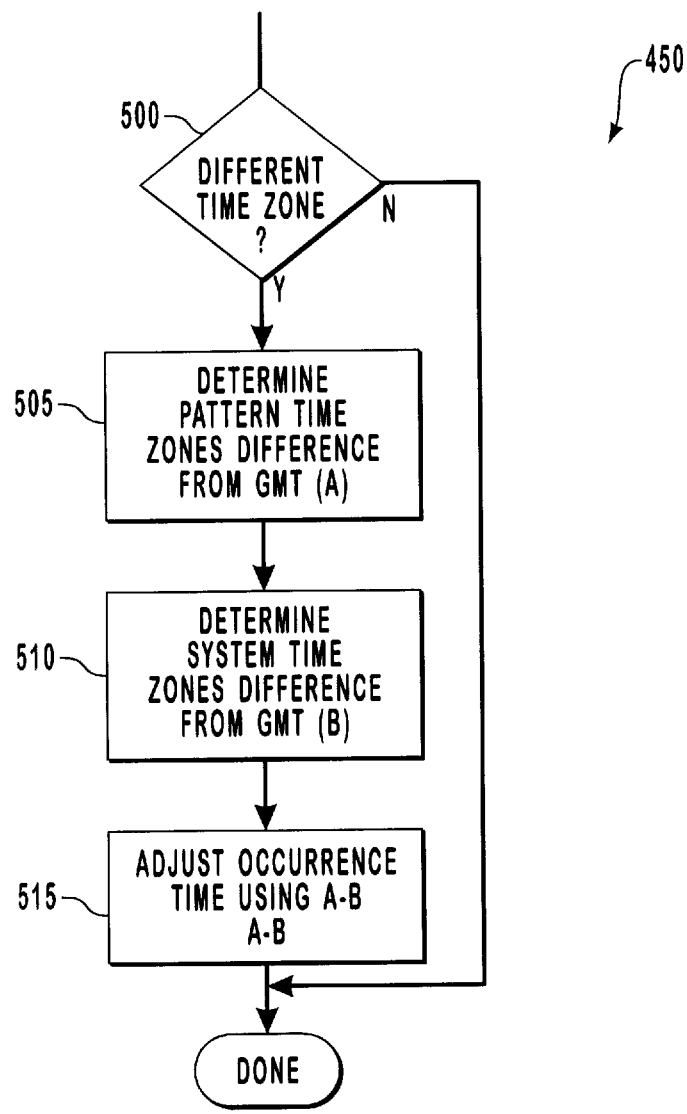

The processor 220 adjusts the time of an occurrence using the procedure 450 illustrated in FIG. 13. Initially, the processor determines whether the time zone 170 of the pattern differs from the time zone stored in the file 240 of storage device 205 or provided by the communications link 235 (step 500).

If the time zones differ, then processor 220 determines the offset of the pattern's time zone 170 from GMT for the reference date (step 505). The processor 220 makes this determination by accessing a file 245 stored on the storage device 205. The file 245 identifies offsets from GMT for all time zones and the dates on which the offsets may change due to daylight savings time. (Taking into account different applications of daylight savings time, there are approximately 48 different time zones worldwide.) The processor 220 finds the time zone identified by the time zone entry 170 of the record 215 in the file 245 and uses the information stored in the file 245 to determine the offset for the reference date. Alternatively, to eliminate any need for the file 245, the information needed to make the determination could be stored in the time zone 170 entry of the record 215.

The processor next determines the system time zone's offset from GMT in a similar manner (step 510). Thereafter, the processor adjusts the starting and ending times of the occurrence based on the difference between the pattern's offset and the system's offset (step 515).

Other embodiments are within the following claims. For example, the recurrence type 115 could be eliminated from the pattern format 100. With this approach, the placement of valid data in an entry of the pattern format 100 would indicate that the entry is to be considered and the placement of null, nonsensical or invalid data in an entry would indicate that the entry need not be considered. Accordingly, a day interval 120 having a value greater than one or a day of week mask 140 that includes at least one bit set to one would be considered while a day interval 120 having a value of zero or a day of week mask 140 having all of its bits set to zero would not be considered.

In another variation, durations could be used instead of ending dates and times. For example, a pattern could describe a series of events that start on Jan. 1, 1996 and continue for five years. Similarly, a pattern could describe a series of events that start at 1 p.m. and each have a duration of two hours.

In another variation, the duration of a pattern of events could be represented using a count of occurrences. For example, a pattern could describe a series of events as occurring on Tuesdays and Thursdays starting on Jul. 1, 1996 and continuing for a duration of 15 occurrences.

In another variation, a pattern could be used to represent events that occur multiple times within a day. A pattern could be used to represent events that occur every "n" hours (e.g, every 2.5 hours), or that occur at certain times of the day (e.g., 9 a.m. and 5 p.m.). Such a pattern could be used, for example, to generate reminders to backup a hard drive every three hours for a period of two weeks.

In yet another variation, exceptions to a pattern could be generated automatically based on a pattern type. For example, if a pattern were designated as corresponding to business days, then exceptions could be created automatically when an occurrence of the pattern fell on a weekend or a holiday.

What is claimed is:

1. In a computer system having a processor and a storage medium readable by the processor, a method of storing a representation of a series of events that reoccur according to a defined pattern and for displaying the series of recurring events to a user of the computer system, the method comprising the steps of:

storing on the storage medium a pattern format that defines dates on which a plurality of events in the series of events occur, the pattern format comprising any combination of:

a first entry that identifies any combination of either the day of the week an event reoccurs, the day of the month an event reoccurs, or the month of the year an event reoccurs, and a second entry that identifies a time interval between events comprising any combination of either the number of days between events, the number of weeks between events, the number of months between events, or the number of years between events, storing on the storage medium a recurrence type indicator that identifies which combination of said entries is stored; and examining said recurrence type indicator, and based on said recurrence type indicator using the stored combination of said entries to reconstruct the series of recurring events for display to the user.

2. The method of claim 1, further comprising the steps of:

storing on the storage medium a time associated with the events in the series of recurring events; and storing on the storage medium information identifying a time zone with which the series of recurring events is associated.

3. The method of claim 2, further comprising the step of extracting occurrences of the series of recurring events from the pattern stored on the storage medium.

4. The method of claim 3, wherein the extracting step comprises extracting the occurrences in a time zone having a first offset from an absolute time value that differs from a second offset from the absolute time value that is a property of the time zone with which the series of recurring events is associated.

5. The method of claim 4, wherein the extracting step further comprises modifying the time associated with the events in the series of recurring events based on a difference between the first and second offsets to produce a time associated with an occurrence of the series of events.

6. The method of claim 4, further comprising storing a table that represents offsets from the absolute time value for all time zones.

7. The method of claim 2, wherein the time is a starting time for each event in the series of recurring events.

8. The method of claim 1, wherein the step of storing a pattern format comprises storing a starting date for the series of recurring events.

9. The method of claim 1, wherein the first entry may identify a plurality of days of a month on which an event in the series of recurring events occurs.

10. The method of claim 1, wherein the first entry may identify a plurality of weeks of a month on which an event in the series of recurring events occurs.

11. The method of claim 10, wherein a particular value stored in the first entry indicates that events in the series of recurring events may occur only on the last occurrence in a month of any day identified in the first entry.

12. The method of claim 1, wherein the first entry may identify a plurality of months of a year in which an event in the series of recurring events occurs.

13. The method of claim 1, further comprising the step of storing an indicator that indicates a day on which weeks begin.

14. The method of claim 1, further comprising the step of storing on the storage medium information identifying exceptions to the pattern.

15. In a computer system having a processor and a storage medium readable by the processor, a computer program product for storing a representation of a series of events that reoccur according to a defined pattern and for reconstructing the series of events comprising:

a computer readable medium having computer-executable instructions embodied thereon, said computer-executable instructions comprising:

means for storing on the storage medium a pattern format that defines dates on which a plurality of events in the series of events occur, the pattern format comprising any combination of:

a first entry that identifies any combination of either the day of the week an event reoccurs, the day of the month an event reoccurs, or the month of the year an event reoccurs, and a second entry that identifies a time interval between events comprising any combination of either the number of days between events, the number of weeks between events, the number of months between events, or the number of years between events, means for storing on the storage medium a recurrence type indicator that identifies which combination of said entries is stored; and means for examining said recurrence type indicator, and based on said recurrence type indicator using the stored combination of said entries to reconstruct the series of recurring events.

16. The computer program product of claim 15, wherein the instructions further comprise:

means for storing on the storage medium a time associated with the events in the series of recurring events; and means for storing on the storage medium information identifying a time zone with which the series of recurring events is associated.

17. The computer program product of claim 16, wherein the instructions further comprise means for extracting the occurrences in a time zone having a first offset from an absolute time value that differs from a second offset from the absolute time value that is a property of the time zone with which the series of recurring events is associated.

18. The computer program product of claim 17, wherein the instructions further comprise means for modifying the time associated with the events in the series of recurring events based on a difference between the first and second offsets to produce a time associated with an occurrence of the series of events.

19. The computer program product of claim 17, wherein the instructions further comprise means for storing a table that represents offsets from the absolute time value for all time zones.

20. The computer program product of claim 16, wherein the time is a starting time for each event in the series of recurring events.

21. The computer program product of claim 15, wherein the instructions further comprise means for storing a starting date for the series of recurring events.

22. The computer program product of claim 15, wherein the first entry may identify a plurality of days of a month on which an event in the series of recurring events occurs.

23. The computer program product of claim 15, wherein the first entry may identify a plurality weeks of a month in which an event in the series of recurring events occurs.

24. The computer program product of claim 23, wherein a particular value stored in the first entry indicates that events in the series of recurring events may occur only on the last occurrence in a month of any day identified in the first entry.

25. The computer program product of claim 15, wherein the first entry may identify a plurality of months of a year in which an event in the series of recurring events occurs.

26. The computer program product of claim 15, wherein the instructions further comprise means for storing an indicator that indicates a day on which weeks begin.

27. The computer program product of claim 15, wherein the instructions further comprise means for storing information identifying exceptions to the pattern.

* * * * *

UNITED STATES PATENT AND TRADEMARK OFFICE
CERTIFICATE OF CORRECTION

PATENT NO. : 5,813,013

DATED : Sep. 22, 1998

INVENTOR(S) : Shakib et al.

Page 1 of 2

It is certified that error appears in the above-identified patent and that said Letters Patent is hereby corrected as shown below:

In the Drawings:

Fig 2A, insert a circle around July 17, 1996

Fig 5B, move "0010000" from the second column of the line labeled 135 to the second column of the line labeled 140

Fig. 7B, line 115, second column, change "0101" to --0101101--

Fig. 9B, line 115, second column, insert --0001111--

Fig. 12, the diamond furthest to the right, labeled "END OF RANGE OR PATTERN?", change the outside label from "XX" to --455--

Col. 1, line 46, after "permits" insert --an--

Col. 6, line 56, after "format 100" insert --(Fig. 1)--

Col. 7, line 22, after "entries" insert --as shown in Fig. 10--

Col. 7, line 24, after "format 100" insert --of Fig. 1--

Col. 9, line 43, after "processor 220" insert --(Fig. 10)--

UNITED STATES PATENT AND TRADEMARK OFFICE
CERTIFICATE OF CORRECTION

PATENT NO. : 5,813,013
DATED : Sep. 22, 1998
INVENTOR(S) : Shakib et al.

It is certified that error appears in the above-identified patent and that said Letters Patent is hereby corrected as shown below:

Col. 9, line 65, after "format 100" insert --of Fig. 1--

Signed and Sealed this

Fourteenth Day of March, 2000

Attest:

Q. TODD DICKINSON

Attesting Officer

Commissioner of Patents and Trademarks